Dec. 20, 1955 T. O. BRANDON 2,727,385
CENTER OF GRAVITY CHECKING DEVICE
Filed June 2, 1954 2 Sheets-Sheet 1

INVENTOR.
Thomas O. Brandon
BY Johnson and Kline
ATTORNEYS

Dec. 20, 1955     T. O. BRANDON     2,727,385
CENTER OF GRAVITY CHECKING DEVICE
Filed June 2, 1954                                              2 Sheets-Sheet 2
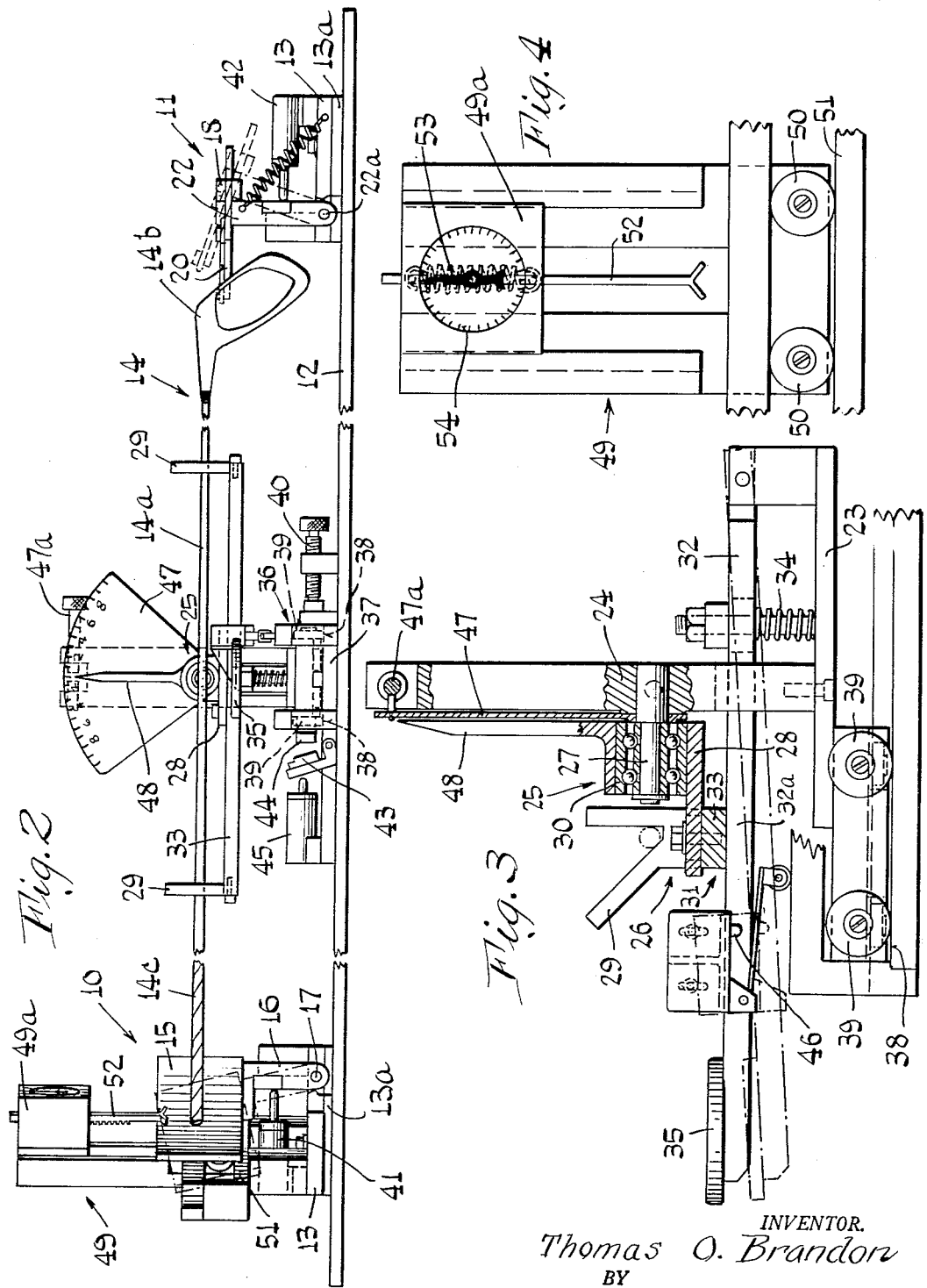
INVENTOR.
*Thomas O. Brandon*
BY
*Johnson and Kline*
ATTORNEYS

United States Patent Office 2,727,385
Patented Dec. 20, 1955

2,727,385

CENTER OF GRAVITY CHECKING DEVICE

Thomas O. Brandon, Cucamonga, Calif., assignor to A. G. Spalding & Bros., Inc., Chicopee, Mass., a corporation of Delaware Application June 2, 1954, Serial No. 433,878

9 Claims. (Cl. 73—65)

The present invention relates to a device for providing matched athletic implements, particularly golf clubs, having a predetermined feel and performance in play.

It has been the practice to provide matched sets of golf clubs in which the clubs of varying length and weight are selected so that they all have substantially the same feel in use. One method of accomplishing this result has been by supporting the golf club at the grip end and measuring the "swinging" weight of the club and then selecting club with predetermined swinging characteristics to form the matched set. This is a tedious job and at best an inaccurate method of matching.

I have discovered that by providing a set of clubs having predetermined correlated centers of gravity I am able to provide an accurately matched set in which all of the clubs have substantially the same feel and play characteristics when in use.

It is an object of the present invention to provide a device whereby the matching of sets or individual clubs of sets may be carried out expeditiously and accurately.

In carrying out the objects of this invention, I provide means for locating the club in a predetermined position on the device and for pivotally supporting the club which is so located by pivot means located at the calculated center of gravity of the club for a club of a predetermined length.

In the preferred form of the invention end engaging members are disposed in a horizontal position to engage and properly locate the clubs carried by a transversely movable carriage positioned between the end members and movable with relation to the end members so that the pivot means on the carriage supporting the club carrier moves along a line which includes the calculated center of gravity of the clubs of various lengths. Thus, by inserting a club in a carrier on the carriage and moving it into engagement with the end engaging members, then freeing the carrier for pivotal movement, the weight distribution of the club can be indicated and corrected to produce a balanced relation on the pivot means for the particular center of gravity of the club so that accurate and uniformly matched clubs can be readily obtained.

Another object of the invention is to provide means for indicating quickly and accurately the required degree of unbalance and/or the necessary weights to correct the unbalance.

Other features and advantages of the invention will be apparent from the specification and claims when considered in connection with the drawings in which:

Fig. 2 shows a side view of the device with a club supported on the carriage.

Fig. 3 is a detail view, partly in section, of the carriage device.

Fig. 4 is a view of the weight indicating device.

Figure 1:
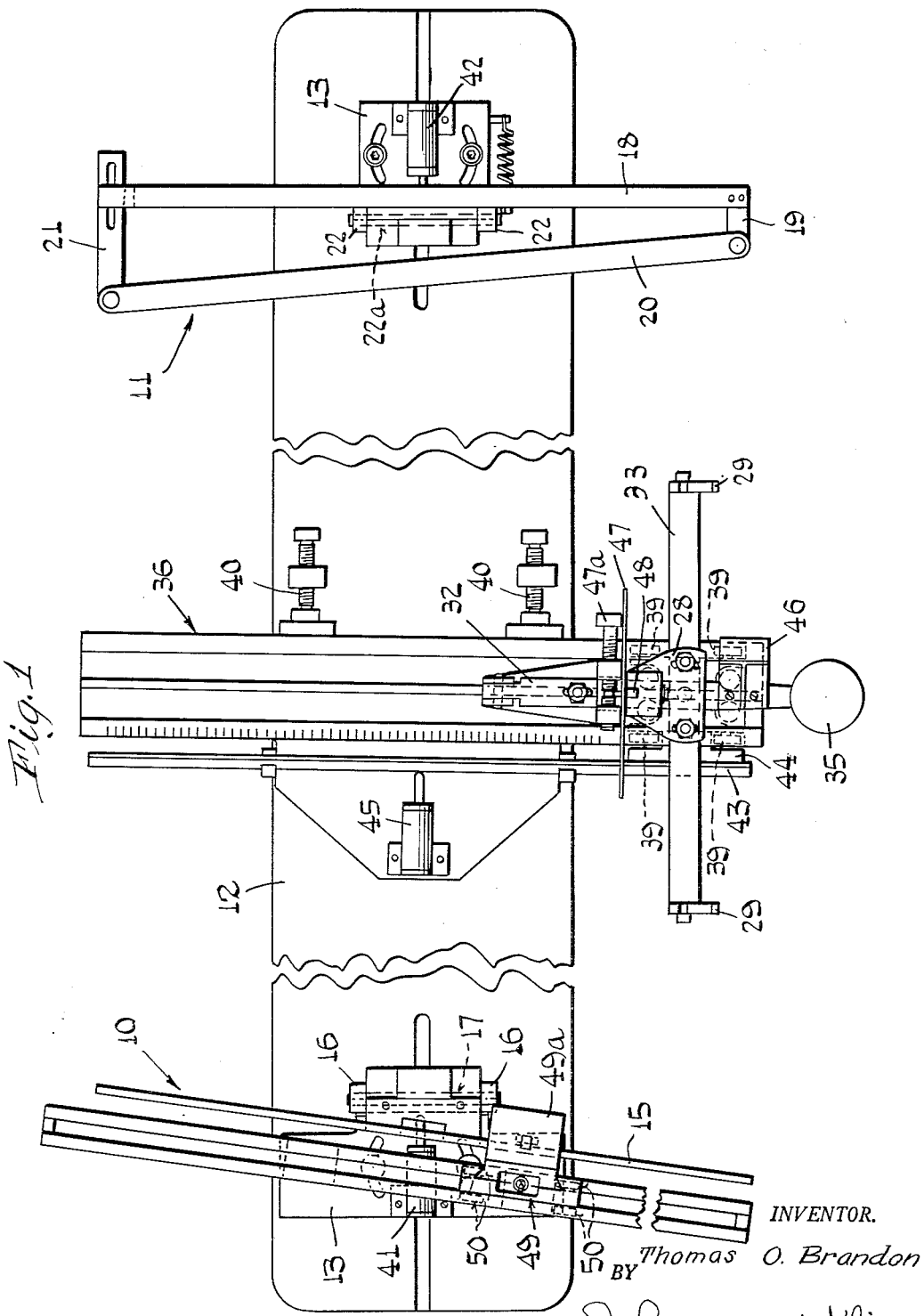
Figure 1 shows a plan view of the device.

While the present invention, which is a specie of the invention disclosed and claimed in my copending application Serial No. 297,849, is useful for providing matched athletic implements of various types, it is herein illustrated as being applied to the matching of golf clubs.

As shown in the drawings, club locating means are provided and comprise end engaging members 10 and 11 which are angularly related so as to receive between them golf clubs of varying lengths. While the end engaging members may be positioned in a vertical plane, in the herein illustrated form of the invention they are mounted in spaced relation on base 12 to lie in a substantially horizontal plane. Each of the end engaging members is carried by a base 13 which is angularly adjustable on a plate 13a mounted for longitudinal adjustment on the base 12. The golf club 14 has a shaft 14a provided with a head 14b at one end and a grip end 14c at the other end. The grip engaging end member comprises an elongate, transversely extending plate 15 angularly mounted on a carrier arm 16. The carrier arm 16 is pivotally mounted at 17 on the base 13 for movement about an axis transverse to the axis of the golf club so that the plate 15 can be moved about the pivot into and out of an end engaging position as shown in full and dot and dash lines in Fig. 2.

The head engaging member comprises a transverse member 18 having a bracket 19 at one end to which is pivoted a narrow head engaging bar 20. The other end of the head engaging bar is connected to a slotted link 21 adjustably carried by the member 18 so that the head engaging bar may be angularly adjusted with respect to the transverse member. It will be noted in Fig. 2 that the head engaging bar contacts the head in substantially a line contact at a point slightly below the connection of the shaft to the head so as to properly position the club without introducing any undesirable turning action on the club head as it is moved into located position between the end engaging members.

The transverse member 18 is mounted on the carrier arm 22 pivotally mounted at 22a on the base 13 in a manner similar to arm 16. The base 13 is angularly adjusted on a plate 13a which is longitudinally adjustable on the base. It will thus be seen that the end members can be adjusted toward one another and angularly with respect to one another so as to receive any desired range of lengths or golf club shafts therebetween.

Positioned between the end engaging members is a carriage 23 having a standard 24 projecting upwardly therefrom and provided with pivot means 25 for pivotally supporting a carrier 26 for the golf club.

In the herein illustrated form of the invention the pivot means comprises a stub shaft 27 projecting from the standard and the carrier comprises a bracket 28 mounted on the shaft to support an elongate cradle 33 having V brackets 29 at each end adapted to engage the club shaft 14a at spaced points and support the club in a substantially horizontal plane. The carriage is pivotally mounted on the stub shaft by means of anti-friction bearings 30 so that it can freely tilt thereon in accordance with unbalance in the club and is so arranged, as shown in Fig. 3, that the axis of the pivot extends transversely through the longitudinal axis of the shaft.

In order to hold the carrier in the horizontal position, such as shown in Fig. 2, and against unintentional tilting so that the ends of the club will properly engage the end engaging members during the locating of the club, blocking means 31 is provided. This means comprises an arm 32 pivoted to the carriage and extending under the carrier with a blocking portion 32a adapted to engage the flat undersurface of the carrier and hold it steady and against tilting about the pivot means. The arm and blocking member are normally urged into engagement with the carrier by means of a spring 34 and the arm has a handpiece 35 whereby the arm can be moved against the spring to an unblocking position shown in dot-dash lines in Fig. 3.

The carriage is mounted on the base for movement transversely of the base by means of elongate track means 36 having a base 37 and a pair of tracks 38 to receive wheels 39 on the carriage. The track means is adjustably mounted on the base by adjusting screws 40 and is so adjusted that the pivot axis of the stub shaft will move along and lie on a line containing the calculated centers of gravity for the various clubs to be positioned by the end members so that said clubs will all have predeterminately correlated proper centers of gravity.

The end members for locating the clubs of varying lengths are held in club engaging position as shown in full lines in Fig. 2 by means of solenoids 41, 42. The track means is provided with an elongate brake 43 actuated by a solenoid 45 and cooperating with a brake shoe 44 on the carriage. Preferably these solenoids are all controlled by a switch 46 carried on the arm 32, as shown in Fig. 3, in such a position that when the arm 32 is depressed to release the blocking member 33, it automatically actuates the switch 46 and controls the solenoids to move the brake to lock the carriage in its adjusted position and to permit the end engaging members to drop to retracted position, as shown in dot-dash lines of Fig. 2 so they will not interfere with the pivotal movement of the club.

When the blocking member is moved out of engagement with the carrier for the club, the carrier and club become free to tilt about the pivot means in accordance with the unbalance in the weight distribution of the club and weights can be added to return the club to a balanced position.

If desired, means may be provided for indicating the amount of unbalance and/or the amount of weight needed to restore proper balance in the club. As herein illustrated, a scale 47 may be mounted on the standard on the carriage and a cooperating pointer 48 provided on the carrier to indicate the amount of unbalance in the club. The carriage may be provided with an adjusting screw means 47a whereby the zero position of the scale can be adjusted. The scale can be calibrated to indicate the amount of weight which must be added to the club, preferably the handle end of the club, to produce a balanced relation of the club about the center of gravity of the club.

Also, if desired, a device may be provided to engage the handle portion and to indicate the amount of force or weight necessary to move the club to a balanced position. One such device is shown in Fig. 4 and at the left-hand end in Figs. 1 and 2 and comprises a frame 49 provided with wheels 50 mounted on a track 51 located in spaced relation behind the end engaging plate 15 and extending transversely of the base so that the frame can be moved transversely of the base and into proper position to cooperate with the club being checked. The frame has a projecting portion 49a extending over the plate 15 in which a depending, spring loaded club handle engaging member 52 is slidable and adapted to engage the club handle. A pointer 53 is connected to the member 52 to be actuated by the movement thereof and cooperates with a suitably calibrated scale 54 on the portion 49a. When sufficient force is applied to the handle by the member 52 to return it to the normal balanced condition, the indication on the scale may be read to show the number of ounces to be added to or subtracted from the handle to produce the balanced relation and the club corrected accordingly.

Both of the foregoing means of determining the amount of weight necessary to provide the correct weight distribution about the club center of gravity are quick and accurate and greatly facilitate the operation of correcting the weight distribution in order to provide sets of clubs which can be accurately matched.

Variations and modifications may be made within the scope of the claims and portions of the improvements may be used without others.

I claim:

1. Apparatus for checking and indicating the center of gravity of athletic implements of the type having a head and a handle portion, comprising spaced angularly related end engaging members adapted to engage the ends of an athletic implement placed therebetween and locate the same; a carriage having pivot means thereon disposed between the end engaging members; means locating the carriage to position the pivot means at the calculated center of gravity for said implement; and a carrier for supporting the implement mounted on the pivot means for tilting movement, said carrier freely supporting the implement for movement on the pivot means in response to unbalance in the implement, whereupon compensating weights may be applied to said implement so as to produce a predetermined balanced relation on the pivot means with respect to the calculated center of gravity thereof.

2. Apparatus for checking and indicating the center of gravity of athletic implements of the type having a head and a handle portion, comprising spaced angularly related end engaging members adapted to engage the ends of an athletic implement placed therebetween and locate the same; a carriage having pivot means thereon disposed between the end engaging members; means locating the carriage to position the pivot means at the calculated center of gravity for said implement; a carrier for supporting the implement mounted on the pivot means for tilting movement; means engaging the carrier to hold the carrier and implement against tilting movement during positioning thereof between the end engaging members; and means for withdrawing the last named means and freely supporting the carrier for tilting movement on the pivot in response to unbalance in the implement, whereupon compensating weights may be applied to said implement so as to produce a predetermined balanced relation on the pivot means with respect to the calculated center of gravity thereof.

3. A device for checking the weight distribution of golf clubs having predetermined correlated centers of gravity comprising an elongate base; spaced transversely extending end engaging members mounted on the base and angularly disposed with relation to one another to receive and position therebetween golf clubs of varying length; a carriage positioned between said end engaging members and having club supporting means pivotally mounted thereon by pivot means to receive and carry a club transversely of the base and position the club ends in engagement with the end engaging members; blocking means engaging and normally holding said club supporting means against pivotal movement and movable out of engagement with said club supporting means to enable the club to be freely supported by the pivot means; means mounting the carriage for transverse movement on the base to move the pivot means along a line including the calculated centers of gravity for the varying club lengths positioned by the end engaging members; means moving the end engaging members out of engagement with the supported club; means holding said carriage in the last named position; and means controlled in response to release of the blocking means to actuate the means moving the end engaging members out of engaging position and the carriage holding means into holding relation.

4. A device for checking the weight distribution of golf clubs having predetermined correlated centers of gravity comprising an elongate base; spaced transversely extending end engaging members mounted on the base and angularly disposed with relation to one another to receive and position therebetween golf clubs of varying length; a carriage positioned between said end engaging members and having a club supporting carrier for positioning a club in engagement with the end engaging members, said carrier being pivotally mounted for tilting movement about an axis extending transversely of the club; track means extending transversely of the base for mounting the carriage for transverse movement on the base of said pivotal axis along a line including the calculated centers of gravity for the varying club lengths positioned by the end engaging members; blocking means pivotally mounted on the carriage and normally engaging and holding said carrier against tilting movement; means moving the end engaging members out of engagement with the supported club; means holding said carriage in the last named position; means for moving the blocking means out of engagement with said carrier to enable the club to be freely supported for tilting movement in accordance with the unbalance in the club; and means controlled in response to operation of the last named means to actuate the means moving the end engaging members out of engaging position and the carriage holding means into holding relation.

5. A device for checking the weight distribution of golf clubs having predetermined correlated centers of gravity comprising an elongate base; spaced transversely extending and engaging members mounted on the base and angularly disposed with relation to one another to receive and position therebetween golf clubs of varying length; a carriage positioned between said end engaging members and having a club supporting carrier for positioning a club in engagement with the end engaging members, said carrier being pivotally mounted for tilting movement about an axis extending transversely of the club; track means extending transversely of the base for mounting the carriage for transverse movement on the base with said pivotal axis moving along a line including the calculated centers of gravity for the varying club lengths positioned by the end engaging members; blocking means pivotally mounted on the carriage and normally engaging and holding said carrier against tilting movement; means for moving the blocking means out of engagement with said carrier to enable the club to be freely supported for tilting movement in accordance with the unbalance in the club; and means for indicating the necessary weight compensation for said club so as to produce a predetermined balanced relation with respect to the calculated center of gravity thereof.

6. A device for checking the weight distribution of golf clubs having predetermined correlated centers of gravity comprising an elongate base; spaced transversely extending end engaging members mounted on the base and angularly disposed with relation to one another to receive and position therebetween golf clubs of varying length; a carriage positioned between said end engaging members and having a stub shaft, a club supporting carrier having bearings pivotally mounted on the stub shaft for tilting movement about an axis extending transversely of the club; track means extending transversely of the base for mounting the carriage for transverse movement on the base to position the club in engagement with the end engaging members, said pivotal axis moving along a line including the calculated centers of gravity for the varying club lengths positioned by the end engaging members; blocking means normally engaging and holding said carrier against tilting movement; means moving the end engaging members out of engagement with the supported club; means holding said carriage in the last named position; means for moving the blocking means out of engagement with said carrier to enable the club to be freely supported for tilting movement in accordance with the unbalance in the club; and means for indicating the necessary weight compensation for said club so as to produce a predetermined balanced relation with respect to the calculated center of gravity thereof.

7. A device for checking the weight distribution of golf clubs having predetermined correlated centers of gravity comprising an elongate base; spaced transversely extending end engaging members mounted on the base and angularly disposed with relation to one another to receive and position therebetween golf clubs of varying length; a carriage positioned between said end engaging members and having a club supporting carrier pivotally mounted for tilting movement about an axis extending transversely of the club and for positioning the club in engagement with the end engaging members; track means extending transversely of the base for mounting the carriage for transverse movement on the base with said pivotal axis moving along a line including the calculated centers of gravity for the varying club lengths positioned by the end engaging members; blocking means pivotally mounted on the carriage and normally engaging and holding said carrier against tilting movement; means moving the end engaging members out of engagement with the supported club; means holding said carriage in the last named position; means for moving the blocking means out of engagement with said carrier to enable the club to be freely supported for tilting movement in accordance with the unbalance in the club; and means for indicating the necessary weight compensation for said club so as to produce a predetermined balanced relation with respect to the calculated center of gravity thereof, said means including a measuring device mounted to move transversely of said base and having means to engage an end portion of said club to move said club to a balanced position.

8. Apparatus for checking and indicating the center of gravity of elongate athletic implements of the type having head and handle end portions; a pivotally mounted carrier for supporting said implement for tilting movement from a balanced position about a transverse axis located at the calculated center of gravity for said implement; and cooperating pointer and scale means controlled by the carrier means for indicating the tilted position of the carrier and the compensating weights for said implement so as to produce a predetermined balanced relation with respect to the calculated center of gravity thereof.

9. Apparatus for checking and indicating the center of gravity of elongate athletic implements of the type having head and handle end portions; means for supporting said emplement for tilting movement about a transverse axis located at the calculated center of gravity for said implement; means movable into engagement with an end portion of the tilted implement for returning the implement to a predetermined balanced relation with respect to the calculated center of gravity thereof; and means operatively connected to the last-named means for indicating the compensating weights necessary to produce said balanced relation.

References Cited in the file of this patent

UNITED STATES PATENTS

| 1,594,801 | Stackpole | Aug. 3, 1926 |

FOREIGN PATENTS

| 381,729 | Great Britain | Oct. 13, 1932 |
| 452,826 | Great Britain | Aug. 31, 1936 |